United States Patent [19]

Barker

[11] 4,072,337
[45] Feb. 7, 1978

[54] TRAILER CONSTRUCTION

[76] Inventor: Joseph K. Barker, Rt. 7 Box 101, Abingdon, Va. 24210

[21] Appl. No.: 653,904

[22] Filed: Jan. 30, 1976

[51] Int. Cl.² .............................................. B63B 35/34
[52] U.S. Cl. ........................................ 296/27; 52/66; 52/69; 9/1.2
[58] Field of Search ................... 9/1.1, 1.2; 296/23 G, 296/27, 26, 105, 109; 52/66, 69, 70, 79.5

[56] References Cited

U.S. PATENT DOCUMENTS

| | | | |
|---|---|---|---|
| 3,009,212 | 11/1961 | Makens | 52/66 |
| 3,114,157 | 12/1963 | Stockmann | 9/1.2 |
| 3,356,410 | 12/1967 | Taylor | 296/27 |
| 3,458,232 | 7/1969 | Frank | 296/27 |
| 3,800,726 | 4/1974 | Murphy | 9/1.1 |

*Primary Examiner*—Richard J. Johnson

*Attorney, Agent, or Firm*—Mason, Fenwick & Lawrence

[57] ABSTRACT

A base construction is mounted on wheels and provided with a trailer hitch for towing purposes. Mounted above the base is a shelter construction comprising vertical longitudinal side walls pivoted to the base to fold inwardly and downwardly to horizontal position, thus minimizing the overall height of the trailer when traveling. A roof construction extends across the tops of the walls and is supported by releasable means connected between the walls whereby they may be released from the walls and roof construction to permit the walls to be folded inwardly. One end of the base extends beyond the associated end wall to form a porch and such end wall is pivotally supported at its upper edge to swing upwardly to a horizontal position to act as a cover or roof for the porch when the side walls are in vertical operative positions.

9 Claims, 12 Drawing Figures

U.S. Patent   Feb. 7, 1978   Sheet 1 of 4   4,072,337
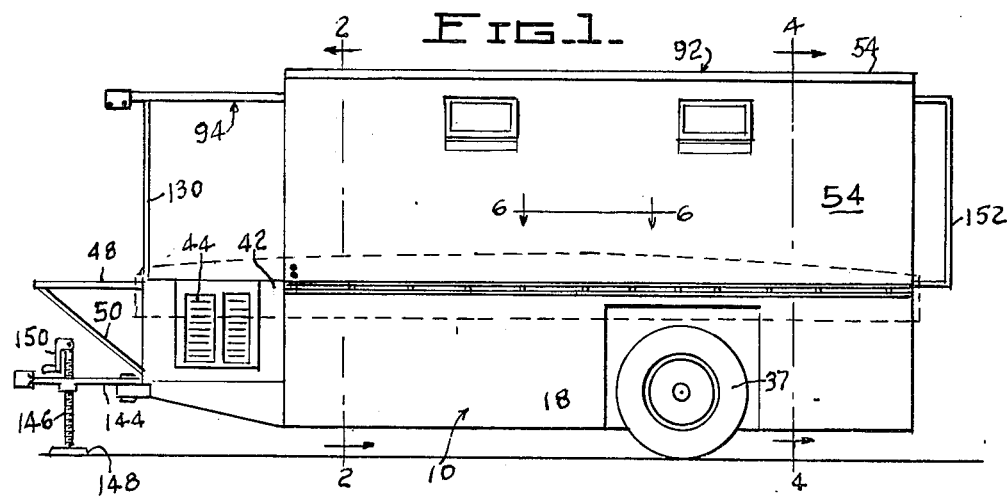
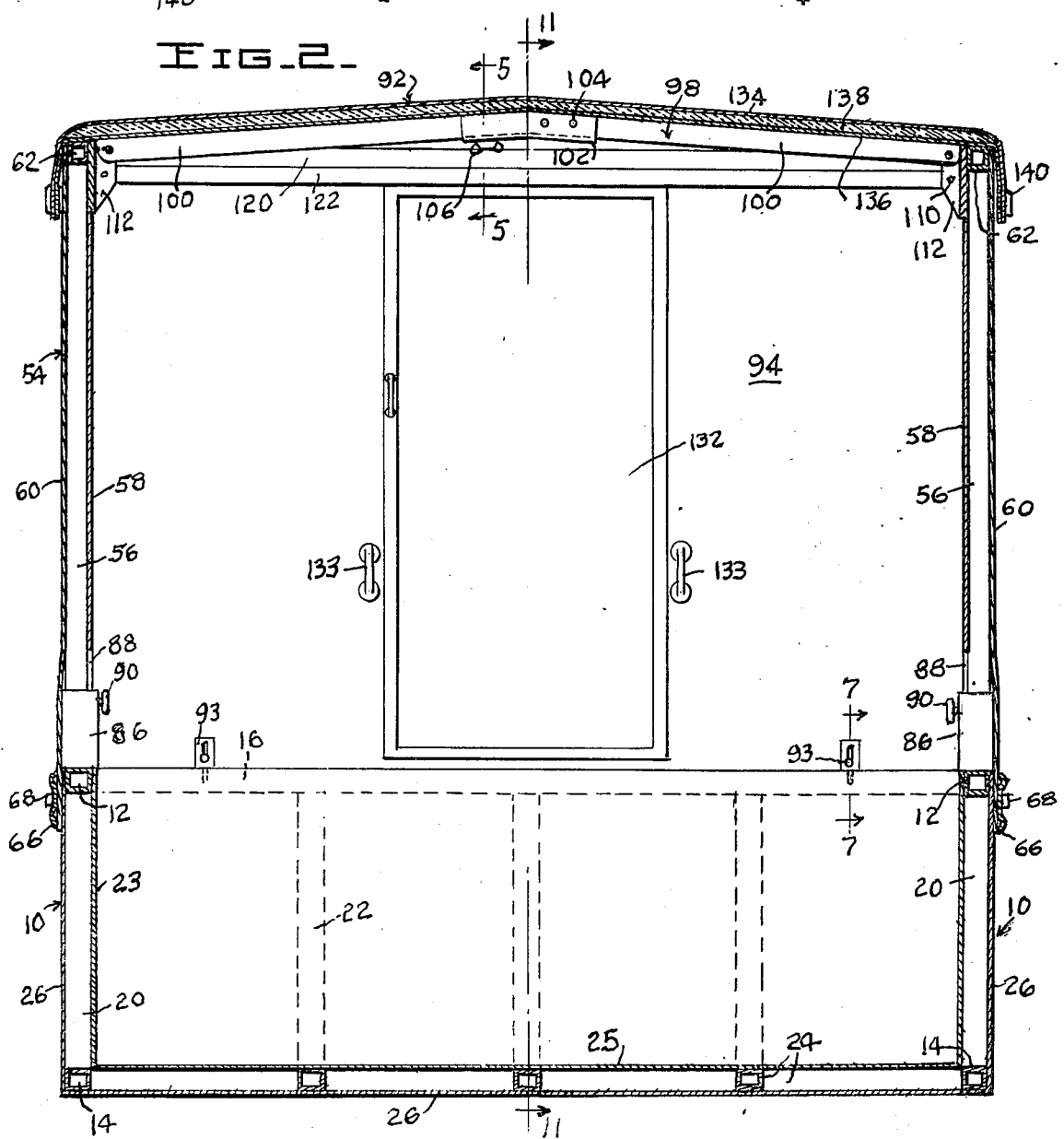

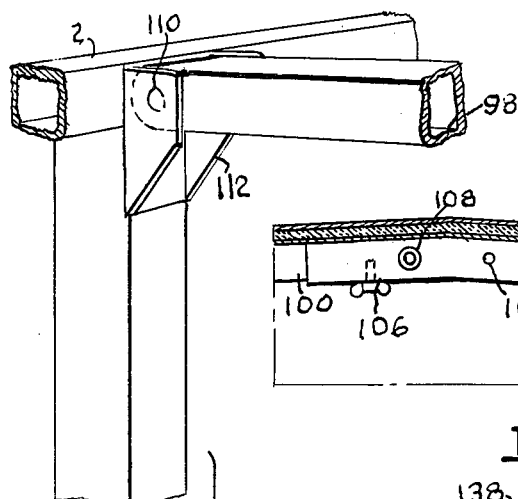
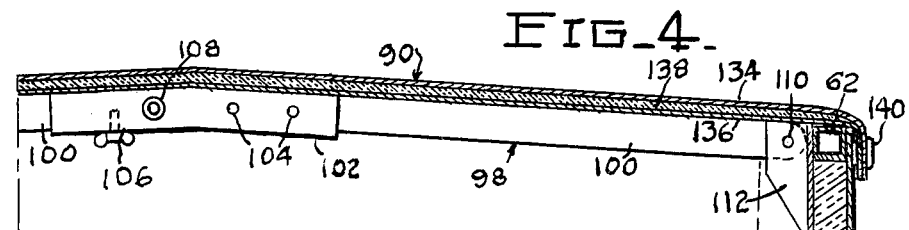
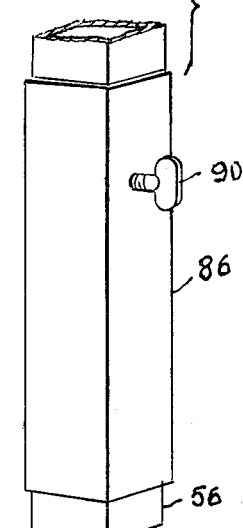
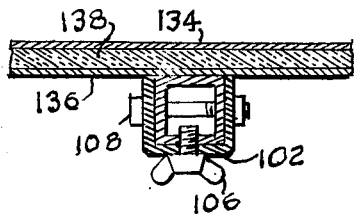
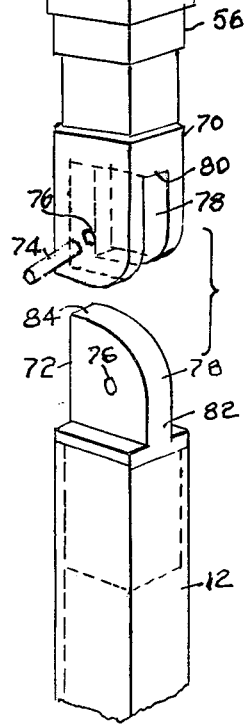
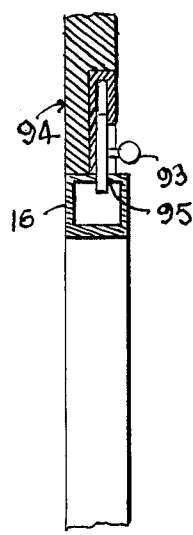
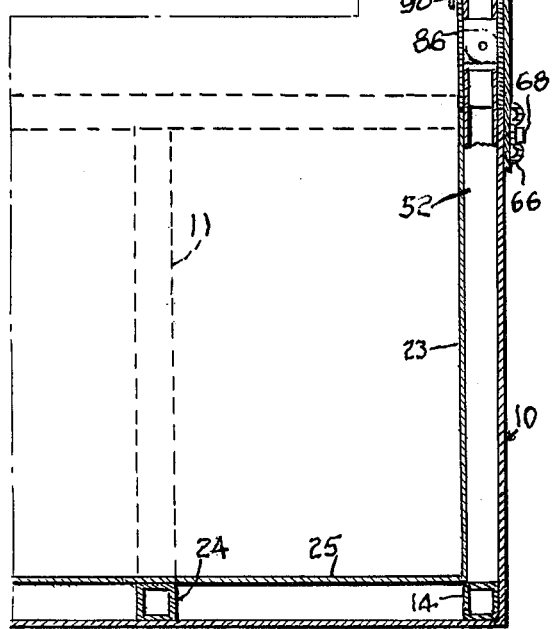

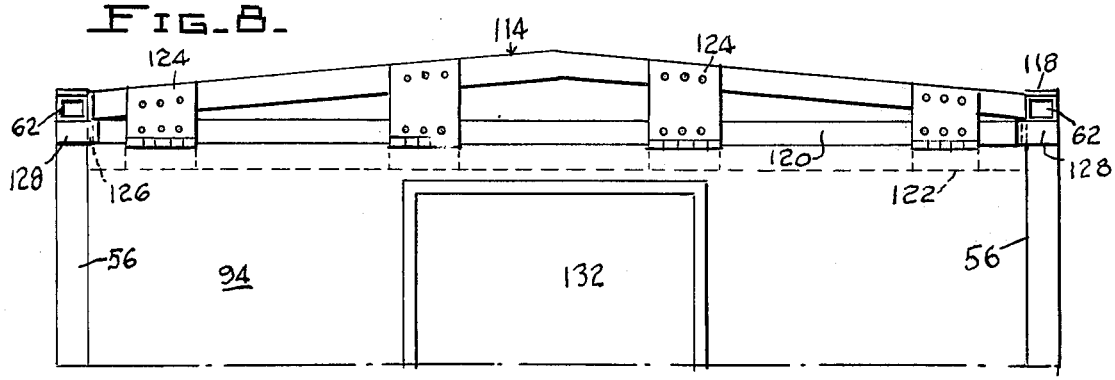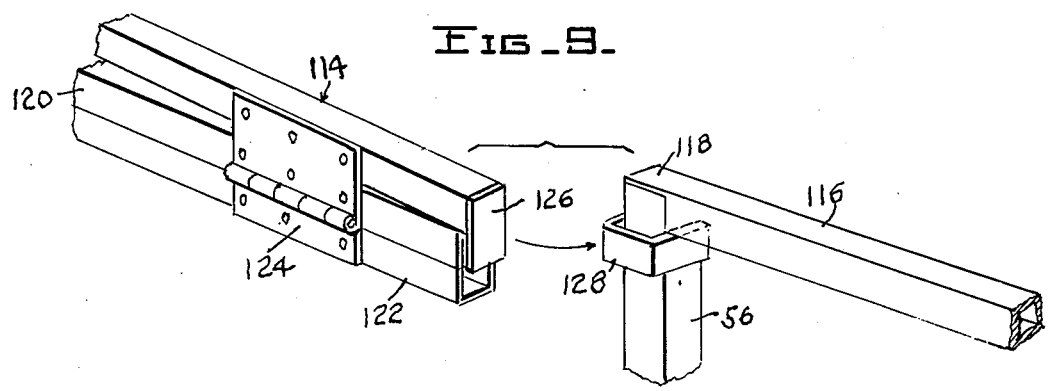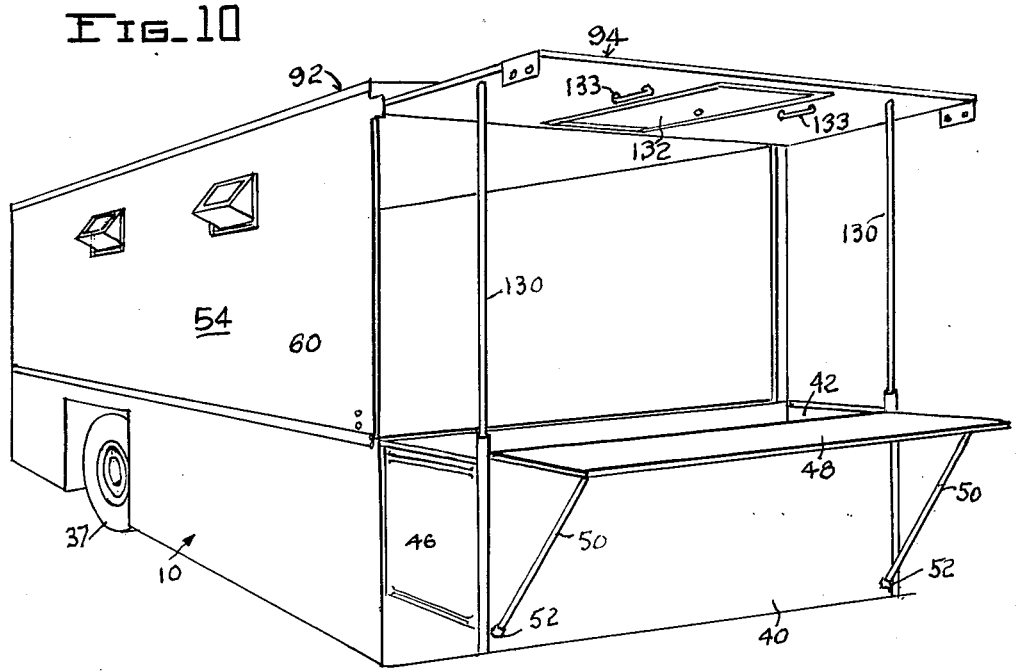

TRAILER CONSTRUCTION

BACKGROUND

Applicant's prior U.S. Pat. No. 3,374,027, shows trailer constructions having a base with which the base of the present construction may be identical. Such base construction is formed of hollow vertical and horizontal closed structural beams so arranged that the external surfaces of the respective sides, ends and bottoms thereof lie in common planes, and an aluminum or similar skin covers the ends, sides and bottom of the base so that it is buoyant, whereby the trailer may be used as a house boat. Such prior construction show the idea of adjustable side walls having posts connected at their upper ends by roof supporting elements in the form of rods turning downwardly at their ends to engage in the posts and movable upwardly to be removed from the posts for the downward and inward swinging thereof to collapse the body of the trailer.

SUMMARY

A base of the type referred to above is employed and the body of the trailer includes rigid side walls, each side wall being provided with vertical spaced supporting posts, an inner sheet of aluminum or other relatively rigid material, an outer skin of flexible material and insulating material between the outer skin and inner aluminum sheet, the insulation filling the spaces between the posts. The side walls are pivoted to the side walls of the base. Specifically, each side wall post is pivoted at its lower end to the respective posts of the base so that the walls may swing bodily inwardly to horizontal position. A flexible roof, also preferably insulated, is supported at the top of the structure by a plurality of transversely extending releasable means connected between the side walls, which when released, permit the side walls to swing inwardly and downwardly.

The plurality of releasable means referred to comprises rigid end walls detachably connected in position and adapted to be bodily removed when the side walls are to be folded. The remaining releasable means comprise roof supporting beams, each of which is made of complementary sections, each pivotally connected at its outer end to one of the side walls and specifically to the adjacent side wall posts. A releasable connection is fixed to one section of each roofing beam and detachably connected to the other section, whereby, when it is released, the elements of each roofing beam may swing downwardly.

At at least one end of the body the end wall is pivotally connected to a transverse beam forming a part of such wall so that the body of such a wall may swing upwardly to a horizontal position and be supported in such a position to form a roof over a porch forming an extention of the adjacent end of the base.

BRIEF DESCRIPTION OF THE DRAWINGS

FIG. 1 is a side elevation of the trailer;

FIG. 2 is an enlarged transverse section on line 2—2 of FIG. 1;

FIG. 3 is an enlarged fragmentary perspective view, parts broken away, showing one of the side wall posts, the means for connecting such post to one of the base posts, and the pivotal connection of the upper end of the upper post to one of the roof beam sections;

FIG. 4 is an enlarged fragmentary section of one side of the structure taken on line 4—4 of FIG. 1, parts being broken away;

FIG. 5 is an enlarged detailed fragmentary section on line 5—5 of FIG. 2;

FIG. 6 is a fragmentary section on line 6—6 of FIG. 1;

FIG. 7 is a detail section on line 7—7 of FIG. 2;

FIG. 8 is a fragmentary elevation of the framing of the forward end of the trailer and end wall;

FIG. 9 is a fragmentary detailed perspective showing the means for connecting one of the end walls to the side wall structure;

FIG. 10 is a perspective view of the trailer;

DESCRIPTION OF THE PREFERRED EMBODIMENT

Figure 11:
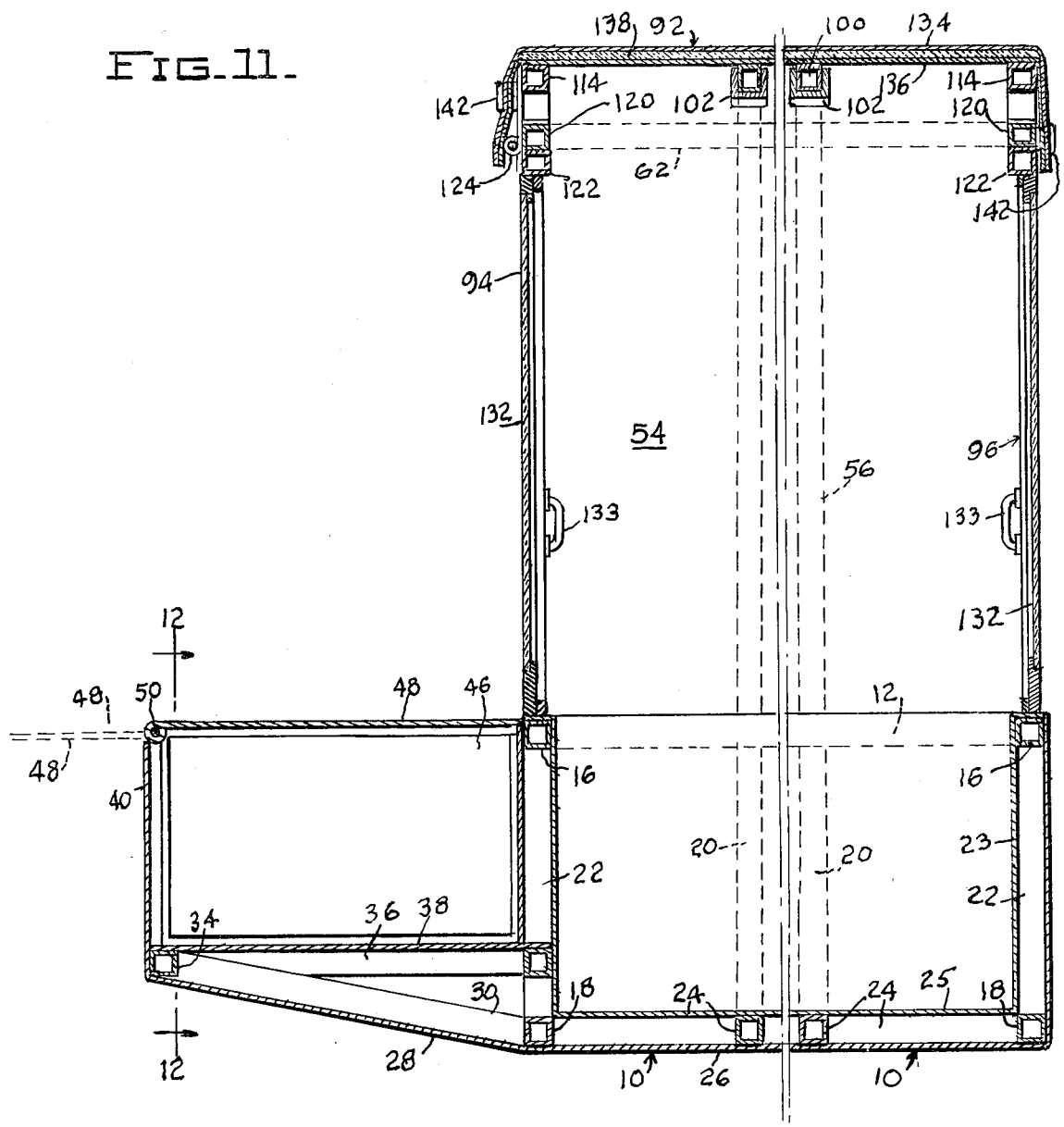
FIG. 11 is a section on line 11—11 of FIG. 2, parts being broken away.
Figure 12:
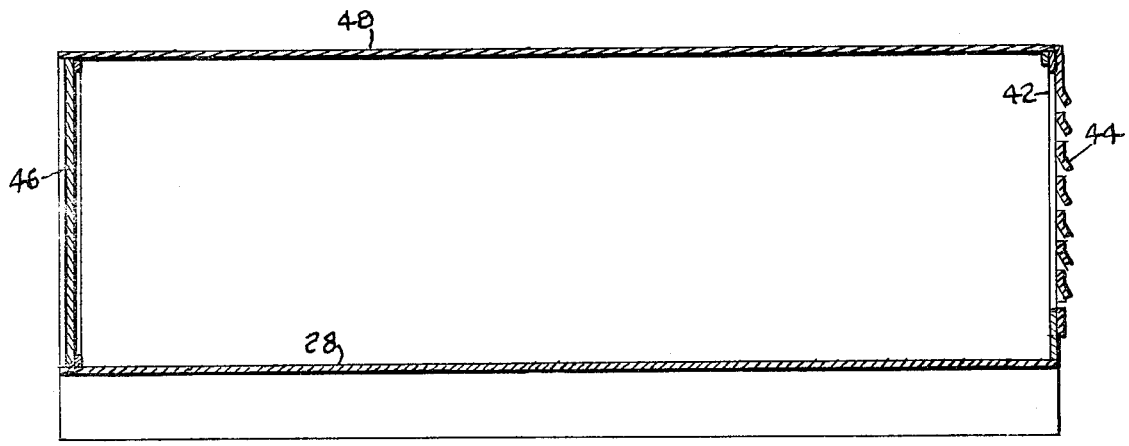
FIG. 12 is a section on line 12—12 of FIG. 11.

Referring to FIGS. 1, 2, 4, 10 and 11, the numeral 10 designates the base of the trailer as a whole which may be made in accordance with my prior patent referred to above. The structure comprises a frame made up preferably of beam elements, all of which are of square box section of the same size. Such frame comprises upper and lower longitudinal beams 12 and 14 respectively at each side of the base, and upper and lower transverse beams 16 and 18 respectively at each end of the base. At each side of the base vertical posts 20 are welded at their upper and lower ends to the beams 12 and 14. At each end of the frame vertical posts 22 are welded at the upper and lower ends to the beams 16 and 18. The bottom of the frame is made up of a grid of transverse and longitudinal beam sections 24. The outer faces of all of the structural elements described at each end and each side of the frame lie in a common plane. The same is true of the bottom faces of the section 24. The base is lined preferably with aluminum sheet 23, the bottom 25 of which forms a floor 25.

The sides, ends, rear end and bottom of the frame are covered by a skin 26. The forward end 28 of the bottom of the skin 26 (FIG. 11) slopes upwardly and lies against the bottoms of the upwardly sloping forward extensions 30 of the lower longitudinal beams 14. A transverse beam 34 is connected between the forward ends of the beam extensions 30. Floor beams 36 are connected between the beam 34 and the base frame. The framing described forms per se no part of the invention except in the combination claimed. The vehicle is provided with supporting wheels 37.

Above the beams 36 is arranged a plate 38 preferably of aluminum forming a tread surface, and the plate 38 constitutes a porch. The skin 26 extends upwardly at the forward end of the structure as at 40 to form a wall for the porch. One side of the porch is closed by a plate 42 (FIG. 1) having a louvered insert plate 44, and the opposite side of the porch is provided with a gate 46. When not in use, the top of the porch may be closed by a plate 48 pivotally supported as at 50 to swing outwardly to a horizontal position as shown in solid lines in FIG. 10 and in dotted lines in FIG. 11. The plate may be supported as a usable shelf when the trailer is in use by rods 50 (FIGS. 1 and 10) having the lower ends engaged in sockets 52 fixed to the wall 40.

A shelter structure 54 is supported on the base 10. This structure comprises spaced normally vertical wall posts 56 arranged in opposite pairs and these posts are covered within the body by relatively rigid sheets 58, preferably formed of aluminum. The outer surfaces of the posts 56 are covered by flexible waterproof sheets 60 of any desired material affixed at their upper ends in any suitable manner, for example, by cementing them to horizontal longitudinal connecting beams 62 welded at each side of the body to the upper ends of the associated posts 56. Between the posts 56 is arranged a body of insulating material 64, at each side of the vehicle (FIGS. 4 and 6). The lower edges of the flexible sheets 60 are fixed to the top portion of the base 10 by longitudinal clamping strips 66 held in position by screws 68 threaded in the adjacent posts 52.

At each side of the vehicle hinge elements 70 and 72 are fixed respectively to the lower ends of the posts 56 and the upper ends of the posts 12. A pin 74 passes through openings 76 in the hinge elements to connect them to each other.

The lower hinge element 72 is in the form of a tongue having an arcuate surface 78 concentric with the associated opening 76. The hinge element 70 is in the form of a yoke having a slot 78 and the top wall 80 is adapted to engage the straight vertical surface 82 at the bottom of the tongue 78, and when the posts are vertically arranged, each horizontal upper extremity 84 of the tongue 78 engages the adjacent portion of the surface 80, thus limiting swinging movement of each post between vertical and horizontal positions.

The maximum dimensions of the hinge elements 70 and 72 correspond in size and shape to the adjacent posts 20 and 56, and a similarly shaped slidable sleeve 86 is adapted to slide downwardly to the position shown in FIG. 2 to cover and lock the hinge elements of each post in vertical position. The aluminum sheets 58 are slotted as at 88 (FIG. 2) to accommodate upward movement in the sleeve 86 to a hinge-unlocking position. A thumb screw 90 fixes each sleeve 86 in upper or lower position.

A plurality of releasable means extends between two walls 54 to support them in vertical position and to support a roof 92 thereabove. Two of the releasable means are in the form of front and rear end walls 94 and 96, respectively, while the remainder of the releasable means comprise roof rafters 98 connected between opposite pairs of posts 56. Referring to FIGS. 2 to 5, inclusive, the roof rafters 98 each comprise complementary sections 100 sloping upwardly from the side walls to the longitudinal center of the vehicle to provide the roof with the necessary pitch. The sections 100 of each rafter are normally fixed to each other by a splice member 102 of U-shaped cross section (FIG. 5) to embrace adjacent end portions of the sections 100. The member 102 is fixed to one of the sections 100 by bolts or rivets 104. The other end of the splice member is normally fixed to the other section 100 of the pair by a wing screw 106. For additional regidity when traveling, a bolt 108 extends through the section 100 adjacent the wing screw. Ordinarily, the bolt 108 is not used, but its use is preferred for additional rigidity for traveling long distances. The remote ends of each rafter 98 are pivoted as at 110 to a U-shaped bracket 112 so that each rafter section can swing downwardly when its splice member 102 is released. The hinge brackets 112 are welded or otherwise secured to the adjacent posts 56.

The end walls 94 and 96 are made of any desirable preferably light material. Above each end wall 94 and 96 is arranged a unitary rafter 114 as shown in FIGS. 8 and 9, opposite end portions of this rafter being pitched to the same degree as the rafters 98. All of these rafters as well as other structural elements described below are preferably formed of square-sectioned aluminum to minimize weight.

The top wall of each end of each beam 62 extends as a flap 118 to be welded in the adjacent end post 56. As shown in FIGS. 8 and 9, a transverse beam extends across the top of the trailer body beneath each rafter 114 and this beam is straight as indicated by the numeral 120. Beneath each beam 120 is another straight horizontal beam 122. Each beam 122 is hinged as at 124 at a plurality of points across the trailer body, the hinge plates in each case being spot welded or otherwise secured to the beam 122 and to the rafter 114 and beam 120. At each end of the beam 114 above the door 94 a plate 126 is welded to such beam and projects downwardly across the adjacent end of the beam 120 and is spaced therefrom. Each end post 56 at the front end of the body is provided with a yoke strap 128, the cross member of which is spaced from the associated post 56 to receive the lower end of the plate 126.

It will be apparent therefore that the end wall 94 is adapted to swing upwardly and forwardly of the trailer body to assume a horizontal position as shown in FIG. 10 and is adapted to be supported in such position by removable posts 130. Thus the end wall 94 is adapted to form a cover for the deck 38. The end walls 94 and 96 are each provided with a pivoted door 132 to provide access to the interior of the trailer body. This door is hinged in any conventional manner provided with any desired type of latch and lock. Bolts 93 are carried by the door 94 to enter openings 95 in the beam 16 to lock wall 94 in closed position (FIG. 7).

The mounting of the wall 96 at the rear of the body may be identical with the mounting of the door 94 to adapt it to swing outwardly. This is not particularly necessary, however. The beam sections associated with the door 96 may be identical with the beam sections 120 and 122 and the beam 122 may be fixed to the adjacent beam 120. In any case, both doors may be lifted vertically to disengage the fingers of the plates 126 (FIG. 9) from the straps 128 to permit the complete removal of the doors. To facilitate such operation, each end wall is provided with handles 133.

The roof 92 is flexible and is formed of upper and lower sheets 134 and 136, respectively, formed of any suitable material and a layer of insulation 138 is placed between these sheets. The insulation preferably terminates at opposite sides of the body and the edges of the sheets 134 and 136 may be cemented or fixed together to extend downwardly over the side of the body and to be fixed thereto with relatively large snap fasteners 140 (FIG. 4).

Referring to FIG. 11, it will be noted that the roof 92 extends downwardly over each end of the body of the trailer in the same manner that it overhangs the sides of the body. The overhang at the ends of the body is shown in FIG. 11 and preferably extends downwardly across the beam 122 to prevent leakage of the water into the body. The end overhangs are also secured by relatively heavy snap fasteners 142 spaced throughout the length of the body.

A trailer hitch 144 (FIG. 1) is provided at the front of the trailer. A relatively long hitch is employed because of the broad square end of the vehicle, to provide for a reasonably short turning radius. Intermediate its ends a hitch is provided with a screw jack 146 having a foot 148 engageable with the ground. The screw is adapted to be rotated by a pivoted handle 150 to engage the foot 148 with the ground to support the structure in horizontal position.

OPERATION

When traveling, of course, the door 94 will be closed and the plate 48 will be swung back over the top of the deck 38 as shown in FIG. 11. When it is desired to stop for any reason, the door 94 may be swung upwardly to the position shown in FIG. 1 and the plate 48 may be swung upwardly and over the end wall 40 of the porch and supported as in FIG. 1. The screw jack 146 of course will be turned downwardly as in FIG. 1. The plate 148 may be loose from the jack so that in traveling the screw may be turned upwardly and removed.

For traveling long distances, it is desirable to collapse the body of the trailer. The handles 133 of either or both end walls may be pulled upwardly to release the fingers of the plates 126 from the straps 128. The wing screws 106 (FIGS. 4 and 5) are then removed together with the bolts 108 if these have been employed, whereupon the left hand end of each splice member 102 as viewed in FIG. 4, can be swung downwardly together with its rafter section 100 to the position shown in dotted lines in FIG. 4. The other rafter section 100 of each pair is similarly swung downwardly, whereupon the sleeves 86 (FIG. 2) are released by turning their thumb screws 90, and then moved upwardly and tightened, the sleeves moving upwardly in the slots 88. Both walls are now free to be swung inwardly and downwardly. The end walls, previously separated as described, may be stored within the base 10. A canvas or similar cover (in dotted lines in FIG. 1) is then used to cover the entire structure which will be substantially at the height of the top of the base 10.

When the trailer is to be used again, the procedures described above are merely reversed. The walls will be swung upwardly to vertical position and the operator will then slide the sleeves 86 downwardly to span across the post hinges and lock them against swinging movement. The end walls will then be connected by placing them in position with the lower ends of the plates 126 (FIG. 8) positioned above the slots formed by the straps 128. The rafters will be restored to their normal positions.

In common with my prior constructions referred to, the base 10 is buoyant. In practice, an outboard motor mounting is fixed to the rear end of the base 10 and the trailer then may be used as a house boat. The end walls are made of relatively light material as is true of other structural elements and it is possible for one strong person to lift either wall to remove it, although it may be done more expeditiously by two people.

I claim:

1. A trailer vehicle comprising a base and an elongated shelter structure arranged over said base, said shelter structure comprising normally vertical rigid parallel side walls, and releasable means extending transversely of and connected between said walls at spaced points therealong for supporting said walls in vertical position, certain of said releasable means comprising transverse rafters extending across said shelter body and pivotally connected at their remote ends to the respective walls, each rafter being formed of complementary sections in end-to-end relationship centrally of the width of said body, and a splicing device connecting the adjacent ends of each rafter and releasable from at least one such end whereby each section is free to swing downwardly about its pivotal connection with said walls, each wall being pivotally connected to said base to swing downwardly and inwardly to substantially horizontal positions after said rafter sections have been swung downwardly to positions adjacent said walls.

2. A trailer vehicle according to claim 1 provided with a roof covering said body and supported by said releasable means, a plurality of said releasable means between and spaced from the ends of said body comprising transverse rafters, each formed of complementary sections in end-to-end relation and pivotally connected at their remote ends to the respective walls, and a splicing device bridging across the adjacent ends of each rafter, each splicing device being fixed to one of said adjacent ends and releasably connected to the other of said adjacent ends.

3. A trailer vehicle according to claim 2 wherein each wall comprises a relatively rigid inner sheet and a plurality of normally vertical posts outwardly of and fixed to each sheet, a bracket connected to each post inwardly thereof and adjacent the top thereof, the outer end of each rafter section having its pivotal connection with one of said brackets.

4. A trailer vehicle according to claim 3 wherein each wall further comprises a sheet of material outwardly of and in engagement with said posts to form with said relatively rigid sheet spaces between adjacent posts, and insulting material filling said spaces.

5. A trailer body according to claim 3 wherein each rafter is provided with a cross sectional shape to form flat bottom surfaces and vertical side surfaces, each splicing device being of U-shaped cross section to fit against the bottom and side surfaces of each rafter, fastening elements securing each splicing device to one of the adjacent ends of one rafter, and a quick detachable fastening device securing the other end of each splicing device to the other of said adjacent ends of such rafter.

6. A trailer vehicle comprising an elongated base, and a shelter structure arranged over said base, said shelter structure including normally vertical rigid side walls, means for connecting said side walls to said base to swing inwardly and downwardly to substantially horizontal positions, two releasable means extending transversely of said shelter structure at spaced points therealong for fixing said side walls in said vertical positions, said releasable means including rigid end walls normally closing the ends of said structure, means for connecting said end walls to said structure and for releasing said end walls to permit complete removal of said end walls, each releasable means including a beam extending across the top of one end wall, means for pivotally connecting said beam to the top of the adjacent end wall whereby the latter is adapted to swing outwardly and upwardly from said body to assume a horizontal position, means for supporting said one end wall in said horizontal position and roof supporting beams extending transversely of said shelter structure, pivotally connected at their remote ends to the side walls to permit downward folding movement and spaced from each other and from said releasable means.

7. A trailer vehicle according to claim 6 wherein said base includes a horizontal extension forming a porch adjacent said one end wall to be sheltered by said one end wall when the latter is swung upwardly to said horizontal position.

8. A trailer vehicle according to claim 6 provided with a beam extending across the top of the other end wall, each side wall being provided inwardly and adjacent the end thereof with an upwardly opening socket, each beam being provided with a depending vertical finger slidable downwardly into one of said sockets whereby each wall may be lifted vertically to release it from said side walls.

9. A trailer vehicle according to claim 6 wherein the lower edge portion of said one end wall has at least one vertically slidable bolt, said base being provided with a socket to normally receive the lower end of said bolt.

* * * * *